UNITED STATES PATENT OFFICE.

JACOB STEIGER, OF LONDON, ENGLAND.

MANUFACTURE OF CEMENT.

SPECIFICATION forming part of Letters Patent No. 694,802, dated March 4, 1902.

Application filed July 8, 1901. Serial No. 67,537. (No specimens.)

*To all whom it may concern:*

Be it known that I, JACOB STEIGER, manufacturer, a subject of the King of Great Britain, residing at and whose postal address is 24 Finsbury Square, London, England, have invented certain new and useful Improvements in the Manufacture of Cement, of which the following is a specification.

My invention relates to the production of a dry magnesia cement containing silica—such, for instance, as that for which Letters Patent were granted to me, No. 627,884; and the object of my present invention is to effect an improvement in the process of manufacturing a cement of this description, whereby the same is simplified and the cost of the production of such cement is cheapened.

According to my invention instead of mixing a solution of silicate of soda or potash (water-glass) with the solution of magnesium chlorid I now use the water-glass and other silicates in a solid form and preferably in their raw state. As examples of solid silicates in the raw state that may be used may be mentioned coal, iron, and other slags, trass, pozzuolana earth, lava, granite, basalt, and the like.

In my said former patent the mixture of chlorid of magnesium and silicate of potash or soda in solution is allowed sufficient time to split up the ingredients and change over, no heat being applied until after these chemical changes have taken place, which may be represented thus:

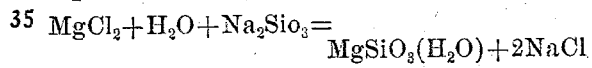

By my present invention I mix the raw material containing the silicate, which is crushed or otherwise disintegrated, with a hot solution of forty to seventy per cent. chlorid of magnesium, heat being simultaneously applied for the purpose of concentrating the solution, whereby the temperature of the mixture is raised to and beyond, say, 130° centigrade. At this comparatively high temperature the mass undergoes chemical changes of a totally-different character to those which follow the cold treatment before referred to. The application of comparatively great heat decomposes the chlorid of magnesium, forming oxid of magnesium and hydrochloric acid—*e. g.*,

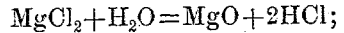

but the freed hydrochloric acid immediately attacks the raw silica material and does not pass off with ebullition, the action of the acid upon the raw material causing the latter to yield its silicate in the form of a hydrated silicic acid—*e. g.*,

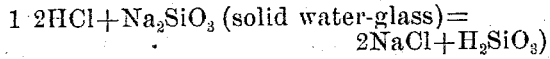

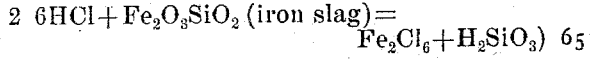

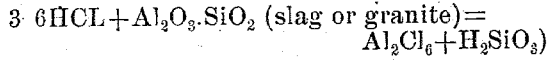

The heating is continued until the mass is evaporated nearly to dryness, when after cooling and stiffening it is crushed and ground to a fine powder. The hydratic silicic acid, which possesses great hardening or cementing properties, remains inert whether or not mixed with the powdered calcined magnesite, (magnesia.) Only on adding water to the cement material (containing calcined magnesite) for immediate use, the hydratic silicic acid commences to exert its cementing powers upon the admixed calcined magnesite, producing a remarkably hard substance, whether used as cement or when mixed with filling materials to form artificial stone, artificial fuel-blocks, and other articles in which cement gives coherence to the materials.

The proportions, by weight, of the ingredients best suitable are as follows:—Chloride of magnesium, (50% $MgCl_2$) =80-90 parts silicious matter (say slag or granite) 20-30 parts calcined magnesite 150-200 parts.

I claim—

1. The process for the manufacture of a silicated magnesia cement in dry form, which consists in mixing a concentrated hot solution of chlorid of magnesium with a powdered silicious material, heating the same to and above 130° centigrade, reducing the mass to a dry powder by continued heating and adding calcined magnesite, substantially as set forth.

2. The process for the manufacture of a silicated magnesia cement in dry form, consisting of mixing a concentrated solution of chlorid of magnesium with a powdered silicious material in suitable proportions, heating such mixture to form a hydrated silicic acid of the silicious raw material, evaporating, drying and powdering the mixture, and adding thereto a suitable proportion of powdered calcined magnesite, substantially as set forth.

In testimony whereof I have hereunto set my hand in presence of two subscribing witnesses.

JACOB STEIGER.

Witnesses:
   GEORGE C. DOWNING,
   WILMER M. HARRIS.